(12) United States Patent
Effenberger

(10) Patent No.: US 6,848,896 B2
(45) Date of Patent: Feb. 1, 2005

(54) HEIGHT ADJUSTING DEVICE FOR ADJUSTING THE HEIGHT OF A BLOW MANDREL

(75) Inventor: Alfred Effenberger, Filderstadt (DE)

(73) Assignee: Hesta Graham GmbH & Co. KG (DE)

( * ) Notice: Subject to any disclaimer, the term of this patent is extended or adjusted under 35 U.S.C. 154(b) by 148 days.

(21) Appl. No.: 10/277,557

(22) Filed: Oct. 22, 2002

(65) Prior Publication Data

US 2003/0082261 A1 May 1, 2003

(30) Foreign Application Priority Data

Oct. 25, 2001 (DE) .......................................... 101 54 325

(51) Int. Cl.[7] .......................... B29C 49/50; B29C 49/58
(52) U.S. Cl. ...................... 425/182; 425/531; 425/535
(58) Field of Search ................................ 425/535, 531, 425/182

(56) References Cited

U.S. PATENT DOCUMENTS

| 3,551,948 A | * | 1/1971 | Eggert ......................... 425/533 |
| 3,907,475 A | * | 9/1975 | Bowers ....................... 425/526 |
| 4,244,913 A | * | 1/1981 | Ryder .......................... 264/348 |
| 5,385,466 A | * | 1/1995 | Konefal ....................... 425/522 |
| 5,603,966 A | * | 2/1997 | Morris et al. ................ 425/168 |

FOREIGN PATENT DOCUMENTS

| DE | 19732905 A1 | * | 2/1999 | ........... B29C/49/76 |
| EP | 265713 A2 | * | 5/1988 | ........... B29C/49/42 |

* cited by examiner

Primary Examiner—Robert B. Davis
(74) Attorney, Agent, or Firm—Pendorf & Cutliff

(57) ABSTRACT

A device for adjusting the "vertical" position of a blow mandrel (10) of a blow molding machine provided to be moveable up and down on a blow mandrel carrier (11) associated with the machine frame of the blow molding machine, upon which at least two blow mandrels are provided, wherein the blow mandrel is provided axially displaceable in a receptacle mounted fixed to the carrier and is adjustable, for example, by means of an adjusting screw (29), which is guided screwable in a threaded bore (26) of the blow mandrel receptacle, the axis (27) of which intersects, preferably perpendicularly, the central axis (28) of the blow mandrel (10), and a force-form-locking achieving translation device (29, 32, 34) is provided, which translates the axial adjustment stroke of the adjusting screw into an adjustment stroke of the blow mandrel, which occurs in the direction of the central longitudinal axis thereof.

4 Claims, 1 Drawing Sheet

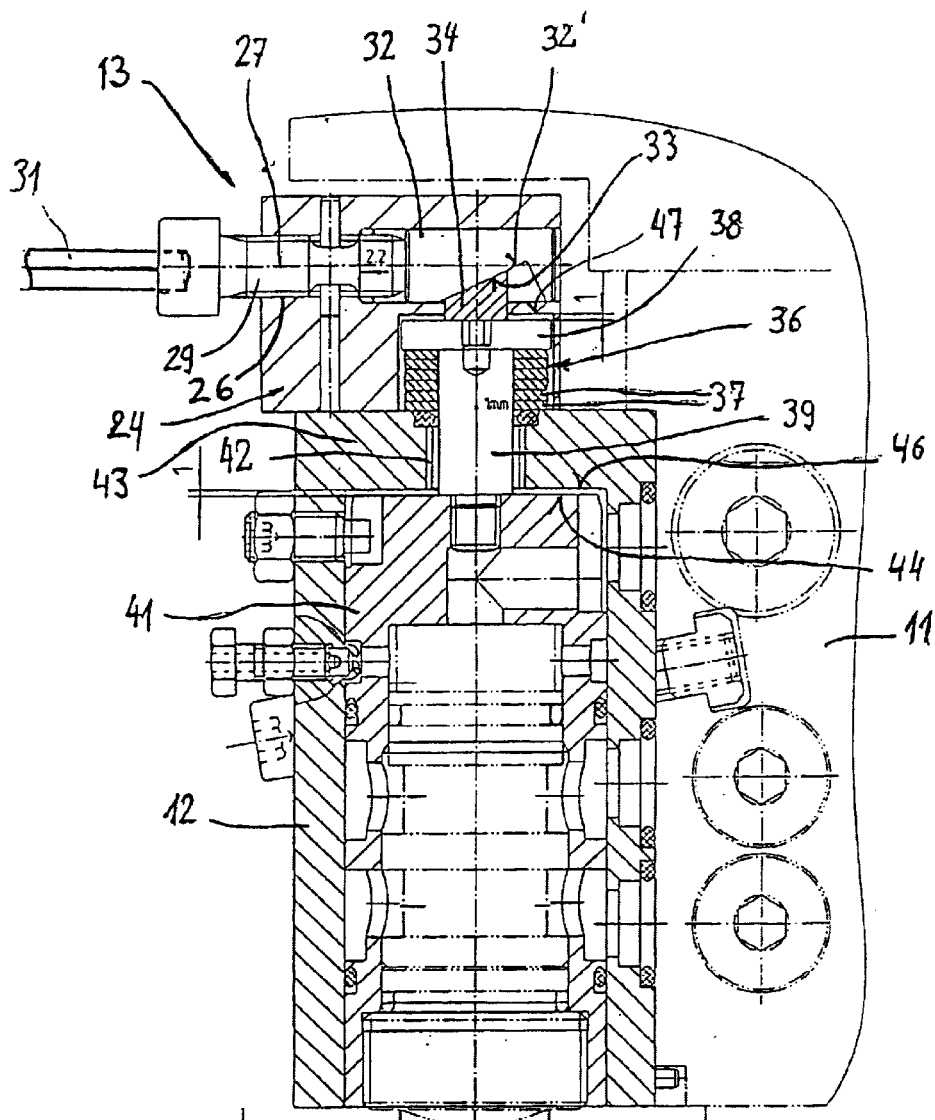
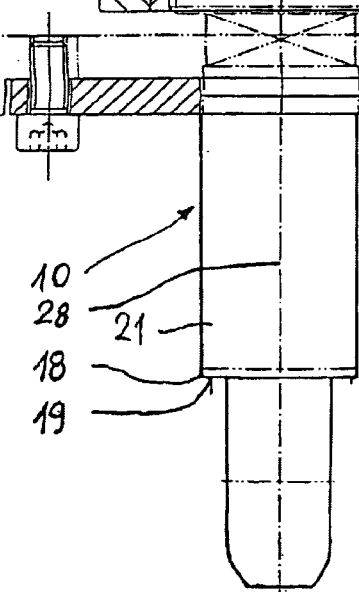
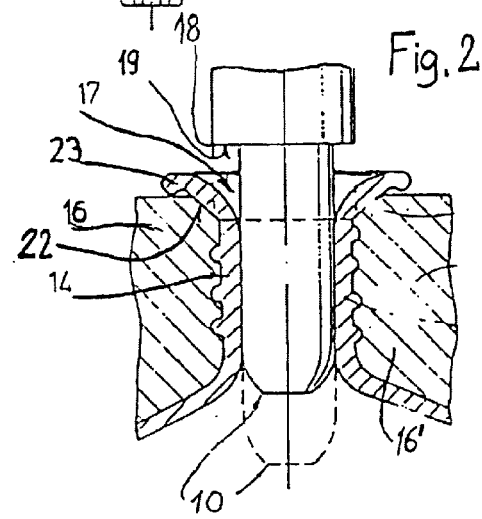
Fig. 1
Fig. 2

HEIGHT ADJUSTING DEVICE FOR ADJUSTING THE HEIGHT OF A BLOW MANDREL

BACKGROUND OF THE INVENTION

1. Field of the Invention

The invention concerns a device for adjusting the "vertical" position of a blow mandrel of a blow molding machine provided to be moveable up and down on a blow mandrel carrier associated with the machine frame of the blow molding machine, upon which blow mandrel carrier at least two blow mandrels are provided, which blow into die cavities of a blow mold provided below the blow mandrel carrier, wherein the blow mandrel during entry into the blow mold both defines the gauge or calibration of a neck region of the mold hollow body as well as causes the separation of plastic material protruding outwards from the neck, wherein the separation occurs by pinching the protruding material by means of a ring shaped cutting edge of the respective blow mandrel, which during penetration into the blow mold lie against a conical counter surface of the blow mold and by this contact along a circular line of the conical surface causes the cutting off of the projecting plastic material, wherein the blow mandrel is provided axially displaceable in a receptacle mounted fixed to the carrier and is adjustable, for example, by means of an adjusting screw, into a suitable position for the pinching off the protruding material.

2. Description of the Related Art

In known adjusting devices of this type, there is provided for the height adjustment of the injection mandrel a set screw in clamping engagement with a threaded blow mandrel receptacle and a retaining or securing screw extending axially there-through and for its part in clamping engagement with the blow mandrel body, which are respectively used as set screw and counter screw. This type of adjustment is only possible with a "resting" machine, since the process requires the loosening of the respective counter screw from the set screw, of which the readjustment and subsequent renewed necessary countering or locking demands substantially more time than available during the duration of a conventional blow cycle. The consequence of requiring this type of out-of-operation phase in order to carry out the adjustment is associated at least with substantial loss of material since, in the case that the extrusion operation of the extruder of the machine is continued in order to maintain thermal stability of the machine, a substantial amount of plastic material is lost, or, in the case that the extruder is also taken out of operation, in that restart period of time until a "thermal" process stability is again achieved, much waste is produced. In addition to this, the taking of the machine out of operation results in economic losses. The likelihood of requiring this type of adjustment increases with the increasing number of blow mandrels provided on a carrier and is otherwise also high in the so-called set up phase, when production is to begin with a newly installed tool.

SUMMARY OF THE INVENTION

It is thus the object of the invention to provide an adjustment device of the above-described type, which makes it possible to carry out a readjustment of the position of the blow mandrel in a short period of time during operation of the blow mold machine.

This task is inventively solved thereby, that a set or adjustment screw rotatable from outside of the machine is provided, which is guided to be screwable in a threaded borehole of the blow mandrel receptacle, of which the axis is transverse, in particular right angled, to the central axis of the blow mandrel, running to intersect this, and that a force-form locking acting deflection device is provided, which translates the axial adjustment stroke of the set screw in the adjustment stroke of the blow mandrel, which occurs in the direction of the central longitudinal axis thereof.

Thereby at least the following advantages are achieved:
1. Simple and rapid adjustment of the height position of the blow mandrel within one of the rest phases during the blowing of the mold hollow body.
2. Minimizing loss of material to the greatest extent possible.
3. Avoidance of down-time of the blow mold machine.
4. Dramatic reduction of waste material, which in principle can be limited to one bottle per cycle.

A stroke and deflection device necessary herefore can be realized in multiple ways, for example thereby, that a deflection or reorientation device is provided, which translates the rotational movement or stroke of an adjustment element slideable along an axis at a right angle to the central longitudinal axis of the blow mandrel into therewith correlated axial stroke or movement of the blow mandrel.

Suitable for this is for example a conical gear wheel mounted rotatable about the horizontal axis, which is in engagement with a second conical wheel, which for its part has a central threaded bore, which is in engagement with a threaded bolt rigidly connected with the blow mandrel.

Also suitable is a worm gear, of which the worm wheel is provided with a central threading, which is in thread engagement with the threaded bolt of the blow mandrel. In a preferred embodiment of the adjustment device a set or adjustment screw is provided which is rotatable about the horizontal axis and thereby axially displaceable, via which a wedge is displaced, upon which is supported a slanted surface of a counter surface of a complementary dimensioned or designed prismatic abutment body rigidly connected with the blow mandrel, wherein this abutment body is maintained in contact with the slanted wedge surface via return springs, via which surface the blow mandrel is supported upon the receptacle.

In a preferred embodiment of such an adjustment device the wedge angle is slightly greater than that value, which could result in a self jamming, and the locking or securing of the adjustment position is achieved by the self jamming of the thread of the set screw.

It is particularly of advantage, when the set screw is in the form of an internal six-sided or hex socket screw, which can be operated via a "long" six sided ball head pin type wrench (Allen wrench), which "from the front" makes possible an easy or comfortable operation of the set screw.

BRIEF DESCRIPTION OF THE DRAWINGS

Further details of the inventive adjustment device can be seen from the following description of a special embodiment on the basis of the figures. There is shown:

FIG. 1 a blow nozzle provided with an inventive adjustment device for the inventive adjustment of the height position of the blow mandrel, seen at the upper end position of the blow mandrel and FIG. 2 a detailed representation of the blow mandrel according to FIG. 1 in a position near to its lower end position, for illustrating the function of the adjustment device.

DETAILED DESCRIPTION OF THE INVENTION

The blow mandrel indicated in FIG. 1 with reference number 10, as well as its blow mandrel receptacle 12 provided on a blow mandrel carrier 11 which is moveable up and down and an adjustment device indicated overall with reference number 13 taken together represent a blow mold machine for production of mold hollow bodies, for example bottles, wherein at a blow station multiple blow mandrels 10 are provided for the simultaneous blowing of a corresponding plurality of, for example, bottle-shape mold hollow bodies, wherein the blow mandrels are moveable up and down together with the blow mandrel carrier. When the blow mandrels 10 are located in their uppermost end position, then the blow mold can be moved to a not shown extrusion station for receiving tube shaped pipelets or parisons. After the blow mold has received the parisons, then it is moved to the blow station while the blow mandrels 10 are situated in their uppermost end position, at which station calibration and blowing occurs upon introduction of the blow mandrel 10 into the mold opening covered by the plastic pre-form 14 in the closed blow mold 16, 16'. At this time the blow mandrels 10 are displaced from their uppermost end position as the starting position, in which they are in a slight vertical separation from the blow mold opening 17, into the lower end position indicated in dashed lines in FIG. 2, at which the respective blow mandrel is supported axially with its cutting and shearing edge 18 forming an edge of a radial, the shaping of the ring-end surface of, for example, a bottleneck of the finished hollow body, defining ring shoulder 19 of the outer or externally cylindrical blow mandrel head 21 at the inner edge area of an outwardly funnel shaped widening conical edge surface 22 which is axially supported by a mold opening 17 bordered by the mold halves 16 and 16'.

In this lower end position of the blow mandrel 10 the collar shaped edge or rim 23 of material protruding from the pre-form 14 is completely or substantially separated from the calibrated or sized bottleneck, so that after the pulling out of the blow mandrel out of the blown hollow body and the opening of the mold 16, 16' this material can be punched or knocked away without significant effort.

If this lower end position of the lower blowing station is not reached by all of the blow mandrels 10, then the height adjustment of the blow mandrels, that is, their upper end position, must be so adjusted, that when they carry out their downward stroke which is controlled by the drive mechanism of the blow mandrel carrier, then all blow mandrels reach the lower end position. Accordingly, each of the blow mandrels is provided with its own adjusting device 13.

The adjusting device 13 includes a housing 24 fixedly connected to the blow mandrel receptacle 12, which for its part is itself a part of the blow mandrel receptacle 12.

In the housing 24 of the adjusting device 13 a threaded borehole 26 is introduced, of which the central axis 27 runs perpendicular to the central longitudinal axis 28 of the blow mandrel 10 and intersects this. In this threaded bore 26 an adjusting screw 29 is screwably guided, which can be actuated "from outside" by means of a merely schematically indicated six sided ball pin key 31. "From outside" means from the side opposite the blow mandrel carrier 11. The set screw 29 is axially supported against a wedge body 32 guided to be horizontally sideable in the inside of the housing 24. The wedge body 32 engages with its slanted wedge surface 32' on a corresponding slanted counter surface 33 of an abutment or contact body 34 in the form a prism and rigidly connected with the blow mandrel, which abutment body 34 by the action of a return spring 36, which is composed of a stack of plate springs 37, is held in contact with the slanted wedge surface 32' of the wedge body 32. They are axially supported against the blow mandrel receptacle 12 and engage with a supporting flange 38 which is carrying the abutment body 34. The side of the flange 38 at which the restoring spring 36 composed of plate springs 37 engages the flange 38 is opposite to the (side of the) abutment body 34. They co-axially surround a connecting bolt 39, which extends between the support flange 38 and the guide body 41, with which the blow mandrel is axially slideably guided in its receptacle 12. The connecting bolt 39 is rigidly connected with the support flange 38 and the guide body 41 and extends through a bore 42, which is provided in the upper "lid" part 43 of the blow mandrel receptacle. In a central neutral position an adjustment region for the height of the blow mandrel 10 is provided or established thereby, that the upper face surface 44 of the guide body 41 is provided in a small separation or gap of for example 1 mm from a counter surface 46 of the lid part 42 of the blow mandrel receptacle 12, likewise the support surface 38 is provided in a small separation from the counter surface 47 of the housing 24 of the adjusting device. By the "outward" rotation of the set or adjustment screw 29 the blow mandrel can thus for its part move upwards since now the abutment body 34 can move upwards, while by the screwing in of the adjustment screw the abutment body 24 and the thereto connected blow mandrel can be pushed downwards.

The wedge angle, at which the slant surface 32' of the wedge body 32 runs diagonal to the "horizontal", which runs at a right angle or perpendicular to the central axis 28 of the blow mandrel 10, is slightly greater that respective value, at which self jamming could occur. The self jamming of the adjusting device is achieved by the self jamming of the thread of the adjusting screw 29.

The adjusting screw 29, the wedge body 32 and the abutment body 34 rigidly connected with the guide body 41 of the blow mandrel 10 form a force-form locking translation device, which translates the "horizontal" adjustment stroke of the adjustment screw 29 into a "vertical" adjustment stroke of the blow mandrel 10, which occurs in the direction of its central longitudinal axis 28.

What is claimed is:

1. Device for adjusting the "vertical" position of a blow mandrel of a blow mold machine on a blow mandrel carrier provided moveable up and down on a machine frame of the blow mold machine, upon which at least two blow mandrels are provided, which serve for the simultaneous blowing of mold hollow bodies which are blown in die cavities of a blow mold provided below the blow mandrel carrier, wherein the blow mandrel causes during penetration into the blow mold both a calibration of the neck area of the mold hollow body as well as a separation of plastic material protruding outward beyond the neck, wherein the separation occurs by pinching the protruding material by means of a ring shaped cutting edge of the respective blow mandrel, which when extending into the blow mold lies against a conical counter surface of the blow mold and by this lying against accomplishes a cutting of the excess projecting plastic material along a circle along the conical surface, wherein the blow mandrel is provided axially displaceable in a carrier fixed receptacle and is adjustable or as the case may be secured by means of a set or adjusting screw in the position for the pinching of the projecting excess material, thereby characterized, that an adjusting screw (29) is provided accessible and rotatable from the outside of the machine, and is guided screwable in a threaded bore (26) of the blow mandrel receptacle, of which its axis (27) intersects, preferably perpendicular, to the central axis (28) of the blow mandrel (10), and that a force-form-locking achieving translation device (29, 32, 34) is provided, which translates the axial adjustment stroke of the adjusting screw into an adjustment stroke of the blow mandrel, which occurs in the direction of the central longitudinal axis thereof.

2. Device for adjusting the "vertical" position of a blow mandrel of a blow mold machine on a blow mandrel carrier provided moveable up and down on a machine frame of the blow mold machine, upon which at least two blow mandrels are provided, which serve for the simultaneous blowing of mold hollow bodies which are blown in die cavities of a blow mold provided below the blow mandrel carrier, wherein the blow mandrel causes during penetration into the blow mold both a calibration of the neck area of the mold hollow body as well as a separation of plastic material protruding outward beyond the neck, wherein the separation occurs by pinching the protruding material by means of a ring shaped cutting edge of the respective blow mandrel, which when extending into the blow mold lies against a conical counter surface of the blow mold and by this lying against accomplishes a cutting of the excess projecting plastic material along a circle along the conical surface, wherein the blow mandrel is provided axially displaceable in a carrier fixed receptacle and is adjustable or as the case may be secured by means of a set or adjusting screw in the position for the pinching of the projecting excess material, thereby characterized, that an adjusting screw (29) is provided accessible and rotatable from the outside of the machine, and is guided screwable in a threaded bore (26) of the blow mandrel receptacle, of which its axis (27) intersects, preferably perpendicular, to the central axis (28) of the blow mandrel (10), and that a force-form-locking achieving translation device (29, 32, 34) is provided, which translates the axial adjustment stroke of the adjusting screw into an adjustment stroke of the blow mandrel, which occurs in the direction of the central longitudinal axis thereof, wherein the adjusting screw (29) is provided rotatable about a horizontal axis (27) and thereby axially displaceable, as a result of which the wedge (32) is displaceable, which supports with its slanted surface (32') against a counter surface (33) of a complimentary designed abutment or contact body rigidly connected with the blow mandrel, wherein this contact body is maintained in the contact position with the slanted wedge surface by the action of return springs (37), via which the blow mandrel is supported against the receptacle.

3. Adjusting device according to claim 2, wherein the wedge angle of the wedge (32) is slightly greater than that value, which is necessary to achieve a self jamming, and that the securing of the blow mandrel (10) in the adjusted position is accomplished by the self jamming of the thread of the adjusting screw (29).

4. Adjusting device according to claim 2, wherein the adjusting screw is an internally six sided screw or hex socket, which can be operated by a six sided ball head pin key (31), which can be applied or introduced in the set screw from the front side of the machine.

* * * * *